United States Patent
Harris

(10) Patent No.: US 7,242,972 B2
(45) Date of Patent: Jul. 10, 2007

(54) MOBILE COMMUNICATION STATION WITH THREE STATES OF ACTIVE, DORMANT, AND SEMI-DORMANT HAVING THE CAPABILITY OF ADJUSTING AN INACTIVITY TIME BASED ON MOBILITY INDICATORS

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 245 days.

(21) Appl. No.: 10/786,694

(22) Filed: Feb. 25, 2004

(65) Prior Publication Data
US 2005/0192046 A1 Sep. 1, 2005

(51) Int. Cl.
*H04B 1/38* (2006.01)

(52) U.S. Cl. .................. 455/574; 455/434; 455/515

(58) Field of Classification Search ............. 455/343.2, 455/343.3, 343.4, 343.5, 574, 421
See application file for complete search history.

(56) References Cited

U.S. PATENT DOCUMENTS

| | | | |
|---|---|---|---|
| 5,301,225 A | * | 4/1994 | Suzuki et al. ............... 455/574 |
| 6,725,053 B2 | * | 4/2004 | Rosen et al. ................ 455/518 |
| 6,804,542 B1 | * | 10/2004 | Haartsen ..................... 455/574 |
| 2003/0099214 A1 | | 5/2003 | Schmidt et al. |
| 2003/0114159 A1 | * | 6/2003 | Park et al. .................. 455/436 |
| 2003/0143949 A1 | | 7/2003 | Karabinis |

OTHER PUBLICATIONS

Keshav, Srinivasan et al., An Empirical Evaluation of Virtual Circuit Holding Time Policies in IP-Over-ATM Networks, *IEEE Journal On Selected Areas In Communications*, vol. 13, No. 8, Oct. 1995, pp. 1371-1382.

\* cited by examiner

*Primary Examiner*—Lester G. Kincaid
*Assistant Examiner*—Sayed T. Zewari

(57) ABSTRACT

One or more indicators as correspond to relative mobility of a wireless mobile station are monitored (21) to provide a resultant mobility indicator (26). Adjustment (24) of one or more inactivity temporal windows make use of this mobility indicator. Other criteria can be employed in a similar fashion, including information (25) regarding the operating capabilities of the mobile station and information (27) regarding communication system setup times. Pursuant to one embodiment, inactivity timers as used for a mobile station coincident with an active state of operation and/or a semi-dormant state of operation are selectively and dynamically extended and/or shortened as based, at least in part, upon such criterion.

20 Claims, 2 Drawing Sheets

MOBILE COMMUNICATION STATION WITH THREE STATES OF ACTIVE, DORMANT, AND SEMI-DORMANT HAVING THE CAPABILITY OF ADJUSTING AN INACTIVITY TIME BASED ON MOBILITY INDICATORS

TECHNICAL FIELD

This invention relates generally to wireless communication systems and more particularly to systems that support an active mode of operation, a dormant mode of operation, and a semi-dormant mode of operation.

BACKGROUND

Wireless communication systems of various kinds are known in the art. Many such systems support power saving strategies as used with mobile stations to aid in extending the effective operating time of a portable device. For example, some mobile stations can support multiple modes of operation wherein the different modes of operation have varying levels of characteristic power consumption associated therewith. By working in concert with one another, the communication system can facilitate the use of reduced power consumption modes of operation by the mobile station when and as appropriate.

For example, some communication systems (such as CDMA2000 3GPPP2 EVDV rel D and others) support an active mode of operation, a dormant mode of operation, and a semi-dormant mode of operation. The exact meaning of these concepts and the characterizing behaviors that define them can and will vary from system to system, of course, but in general, an active mode of operation tends to characterize the operational state of a mobile station when that mobile station is actively using an acquired communications channel to support normal communications (by transmission, reception, or both). Similarly, a dormant mode of operation tends to characterize the operational state of a mobile station when that mobile station is without an allocated communication channel (though other related capabilities, such as PPP functionality and the ability to communicate through common channels, may be nevertheless present) (for present purposes, it will be presumed that the concept of "dormant" subsumes both "dormant" and "idle" states as those terms are otherwise often understood by those skilled in this art).

A semi-dormant mode of operation comprises a more recently recognized operational state and generically represent a mode of operation that lies, functionally and/or operationally, between whatever comprises an active mode of operation and a dormant mode of operation in a given system. For example, in at least one system, the semi-dormant mode of operation is largely characterized by a lack of an allocated bearer channel but where the platform nevertheless continues to receive (or provide) periodic RF environment triggered system updates on a common channel such that the system can immediately effect channel assignment for the target without needing to page the target first in order to ascertain its RF environment.

Such a mobile station can aid in reducing system resource requirements by moving from an active mode of operation to a semi-dormant mode of operation while preserving an ability to relatively quickly resume active status as the semi-dormant-to-active transition can usually be accomplished more quickly than the change from dormant to active status.

While such multiple-state mobile stations can operate in a manner than benefits both the mobile station and the communication network itself, there are operating conditions that can lead to worsened, rather than improved, operating conditions. For example, a mobile station that exhibits or experiences high mobility while in a semi-dormant mode of operation will typically make frequent use of system communication resources to update the network with respect to its presently perceived reception conditions. Such high-mobility-instigated updating behaviors are, of course, often similar or identical to the same behaviors exhibited by a mobile station when undergoing high mobility while in an active mode of operation, except that this communication is over a common channel and thus is typically less tightly power controlled. This is not to say, however, that such high mobility-related behaviors have an equal overall network/user impact. In fact, the system impact varies considerably as between these two modes of operation.

During an active mode of operation, a mobile station already has an allocated communication resource, which is typically power controlled or rate controlled. Mobility-related updates therefore typically represent little increased consumption or system cost; that is, once a mobile station has an allocated channel, the existence or absence of frequent update transmissions, largely becomes irrelevant. During a semi-dormant mode of operation, however, the mobile station will not have access to a constantly allocated channel. Instead, the mobile station will be competing with other mobile stations for use of a potentially scarce common communication resource to effect its update transmissions. This can lead in many instances to undue loading of such resources.

Attempts to ameliorate such concerns are often hampered further by a frequent design requirement to spare the user from widely fluctuating user experiences. Therefore, a solution that seeks to address the high-mobility-based problems noted above must also usually not, at the same time, unduly lead to an unacceptable increase in system access time.

BRIEF DESCRIPTION OF THE DRAWINGS

The above needs are at least partially met through provision of the inactivity window adjustment method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one monitors at least one indicator of relative mobility regarding a wireless mobile station to thereby provide a mobility indicia and then uses that mobility indicia to adjust an inactivity temporal window during at least one mode of operation for the wireless mobile station. For example, an inactivity temporal window during an active mode of operation can be dynamically altered as a function, at least in part, of the mobility indicia. As another example, an inactivity temporal window during a semi-dormant mode of operation can be similarly dynamically altered as a function, at least in part, of the mobility indicia.

So configured, a mobile station exhibiting high mobility behaviors during an active mode of operation can have its inactivity timer adjusted to extend the duration of inactivity that will be tolerated before causing the mobile station to switch to a semi-dormant mode of operation. Such an extension will comport with the essentially reduced cost of supporting that mobile station on the network, as moving that mobile station to a semi-dormant mode of operation during a high-mobility experience is likely to nevertheless involve and require a significant commitment of network resources to that mobile station. As another example, a mobile station exhibiting high mobility behaviors can have its inactivity timer as used during its semi-dormant mode adjusted to shorten the duration of inactivity that will be observed before causing the mobile station to switch to a dormant mode of operation. Such an adjustment will reduce the resource usage impact of that mobile station during such conditions.

Other considerations can also be used to inform the dynamic control of such inactivity timers. For example, the operating capabilities of a given mobile station and/or present system set up times can also be used, alone or in conjunction with the mobility-based influence noted above, to adjust the inactivity time frame as used by a mobile station during an active and/or a semi-dormant mode of operation.

So configured, a mobile station can be better integrated into the overall operation of a communication system while also tending to ensure an acceptable level of user experience.

Figure 1:
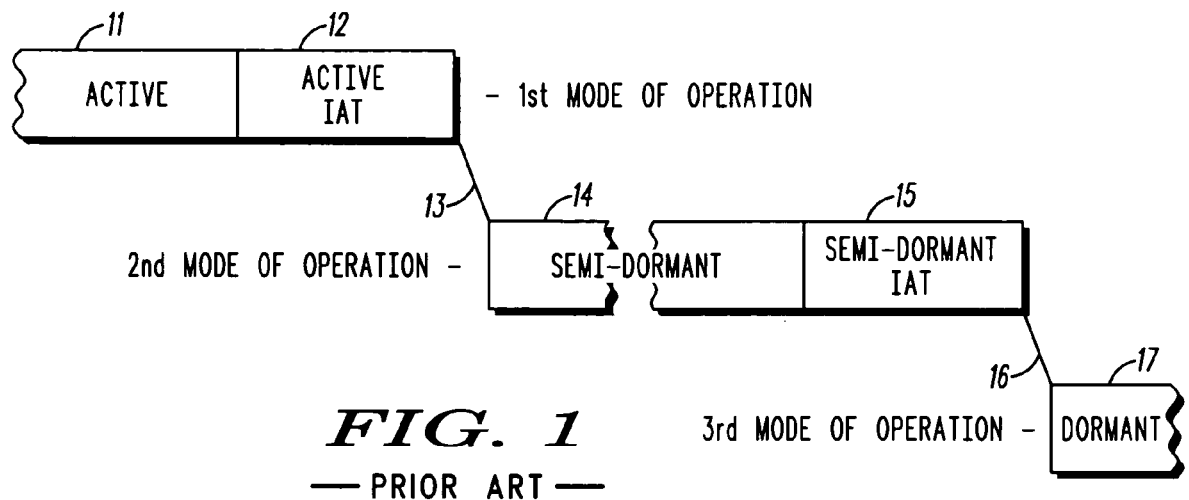
FIG. 1 comprises a schematic timing diagram as configured in accordance with the prior art.

Referring now to the drawings, and in particular to FIG. 1, it will likely aid the reader in understanding these embodiments by first describing the illustrative multiple modes of operation that are generally contemplated herein. When a given wireless station has acquired a radio frequency channel that status equates with a first mode of operation (it will be understood that this channel can comprise any of a wide variety of radio frequency and modulation allocation mechanisms including, but not limited to, frequency division multiplexing, time division multiplexing, and/or spread spectrum mechanisms including code division multiplexing and frequency hopping, to name a few).

This first mode of operation can include various operational states including an active state 11 (when, for example, the mobile station is actively transmitting or receiving bearer transmissions such as data) and a so-called active inactivity timer (IAT) state 12. When the mobile station becomes inactive during the first mode of operation (for example, when active transmission or reception of bearer information concludes) an active IAT permits a scheduled window of inactivity of specific duration as is well understood in the art.

If and when the mobile station becomes active during this active IAT window 12, the inactivity timer is usually reset. Conversely, if the mobile station does not again become active during the active inactivity window 12, the first mode of operation (including the radio frequency channel allocated to the mobile station) is torn down 13 and the mobile station begins another mode of operation such as a second mode of operation. (Those skilled in the art will recognize that the inactivity timing functionality can be provided by the mobile station itself and/or by the network infrastructure. These embodiments contemplate all such approaches.)

So configured, a mobile station can remain in the first mode of operation for a lengthy period of time even though only intermittent transmissions and/or receptions are occurring, so long as this activity occurs with sufficient periodicity to avoid the inactivity timer concluding its countdown.

When in the second mode of operation, the mobile station functions in a semi-dormant 14 state of operation. Such a state can encompass a wide variety of supported or inhibited capabilities and functionality. In general, a semi-dormant state comprises a set of capabilities and/or status that lies between normal full functionality and a dormant (or idle) state as specified by a particular platform or system. More particularly, a semi-dormant state is one that will typically permit a mobile station to transition to the first mode of operation more quickly than from the dormant state and/or to begin such a transition process more quickly (at least on average) than when beginning such a transition process from the dormant state.

For example, a mobile station in a semi-dormant state will often have no acquired radio frequency channel as typically characterizes the first mode of operation, but will nevertheless usually monitor for volunteer and/or periodic or mobile/RF triggered updates on a common or random access channel. This monitoring behavior permits such a mobile station to often react more quickly to a need to transition to a first mode of operation than might otherwise be typically expected when the mobile station exhibits dormant behavior.

Semi-dormant operability typically requires greater power consumption requirements than dormant behavior. Mobile stations are therefore usually not left continuously in such a state. Instead, a system that provides for semi-dormant states also usually provides a semi-dormant IAT window 15 for use therewith. Such a window can be concurrent with the entire time that a mobile station resides in a semi-dormant state or can be initiated upon some event or temporal trigger of choice. So configured, a mobile station in the second mode of operation will remain in the semi-dormant state until whichever occurs first—a transition to the first mode operation or expiration of the IAT window 15.

When the latter occurs, the mobile station will then typically transition 16 to a third mode of operation comprising, in the usual embodiment, a dormant state 17 (some platforms/systems accommodate at least a fourth mode of operation comprising, for example, an idle state). Depending upon the embodiment, the mobile station can then later transition to a semi-dormant state and/or an active state as desired.

Pursuant to these embodiments, the duration of the active inactivity timer window 12 and/or of the semi-dormant inactivity timer window 15 is dynamically altered (by increasing and/or decreasing the duration of the window) as a function, at least in part, of various events and/or observations of interest.

Figure 2:
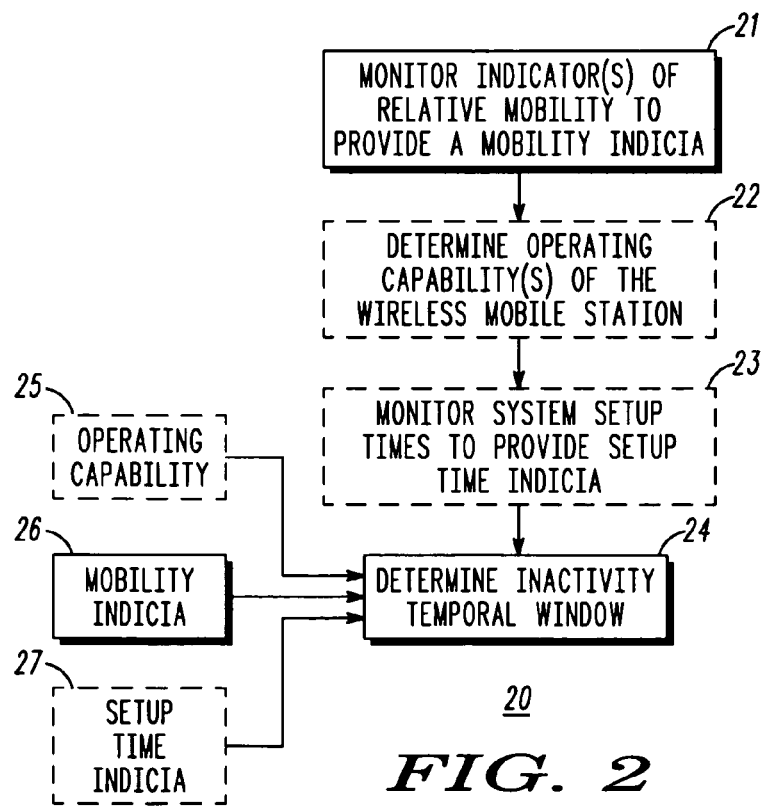
FIG. 2 comprises a flow diagram as configured in accordance with various embodiments of the invention.

For example, and referring now to FIG. 2, a corresponding process 20 can begin by monitoring 21 at least one indicator of relative mobility regarding the wireless mobile station to provide a mobility indicia. Such monitoring can occur at any of the mobile station itself or at another infrastructure element such as, for example, a radio access network (RAN) element. It will also be understood that such monitoring can comprise a shared or distributed activity that includes participation of a plurality of network elements.

A variety of indicators can be monitored to provide insight into such relative mobility. A sector hand-off rate that exceeds a predetermined rate (either as an absolute measure or as measured over some required window of observation) can serve as such an indicator. The rate at which a given mobile station provides radio frequency measurement report messages (as are known in the art) can also serve as such an indicator. These and other metrics can tend to provide an indication regarding the relative mobility of a given mobile station. Relatively high mobility, in turn, tends to cause a mobile station to engage in system-related transmission activities on a more frequent basis than is observed for mobile stations that are stationary or moving less quickly. Such increased system-related transmissions are relatively benign when exhibited during the first mode of operation but can burden both the network and the mobile station itself when exhibited during a semi-dormant state as characterizes the second mode of operation.

In addition to monitoring 21 one or more relative mobility indicators, optionally the process 20 can also determine 22 an operating capability of interest of the wireless mobile station and/or can monitor 23 wireless communication system setup times to provide a setup time indicia. Operating capabilities of interest can include but are not limited to operational modes that are available to a given wireless mobile station (for example, whether the mobile station is capable of operating in the second mode of operation, present power reserves, and so forth). Wireless communication system setup times can comprise, for example, an average or median of setup times as are currently being experienced by other wireless communication units that are accessing the system (as typically though not necessarily measured over some relevant period of time). (Such supplemental information can be obtained in any appropriate way as corresponds to a given mobile station and/or communication system. For example, one system may provide a database and/or server that can readily provide the operating capability information of interest while in another system, such information may be readily gleaned upon interrogating a mobile station regarding its native capabilities. Similarly, setup time information can be readily accumulated by the communication system itself and retained for ready access.)

Pursuant to this process 20, and using whichever of the mobility indicia 26, operating capability 25, and setup time indicia 27 information as may be available, one then determines 24 an inactivity temporal window by, for example, using such information to adjust an inactivity temporal window during at least one of the modes of operation. In a preferred embodiment, the process 20 will permit adjustment of the inactivity temporal window for both the first mode of operation and the second mode of operation though adjustment of only one can be provided if so desired.

Figure 3:
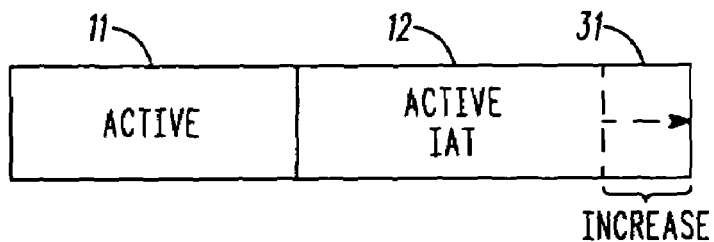
FIG. 3 comprises a schematic timing diagram as configured in accordance with various embodiments of the invention.

To illustrate, and referring momentarily to FIG. 3, when the mobility indicia 26 indicates that a given wireless mobile station is exhibiting relatively high mobility, the inactivity temporal window 12 for the first mode of operation can be lengthened 31. As a result, when the mobile station is in a first mode of operation (and hence likely has an acquired channel in any event) the mobile station will be permitted to remain in that mode of operation for a longer period of time than would otherwise ordinarily be permitted. Such an accommodation better suits the needs of that mobile station under these operating circumstances. In particular, this mobile station will necessarily require system communication resources on a more frequent basis than slower moving mobile stations and the present availability of the communication channel during the first mode of operation well matches this need.

Figure 4:
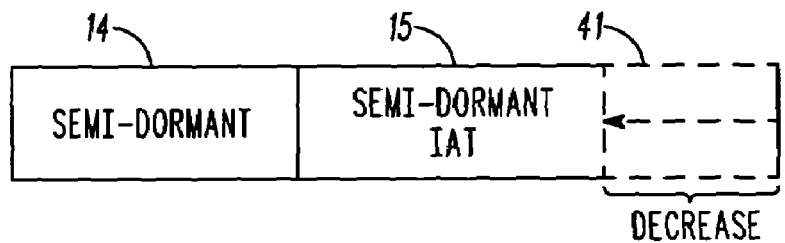
FIG. 4 comprises a schematic timing diagram as configured in accordance with various embodiments of the invention.

As another illustration, and referring momentarily to FIG. 4, when the mobility indicia 26 indicates high mobility, the inactivity temporal window 15 for the second mode of operation can be shortened 41. As a result, when the mobile station is in the second mode of operation (and hence in a semi-dormant state), the mobile station will be transitioned to a more dormant state more quickly than would otherwise be the ordinary case. By effecting this transition sooner than usual, the mobile station will be relieved from system access behaviors that would otherwise tend to potentially unduly load the resources of the network as well as the power consumption requirements that would otherwise be necessary to effect such behaviors.

So configured, the inactivity temporal windows as used by the mobile station during various operating modes of operation can be dynamically controlled to thereby automatically cause the mobile station to extend its use, or to more quickly forgo its use, of a given mode of operation in favor of a different mode of operation. This dynamic control can, in turn, benefit both the communication system and the power consumption tendencies of the mobile station.

As noted above, and referring again to FIG. 3, such dynamic adjustments can be further based upon (or, if desired, solely based upon) other information such as the specific operating capabilities of a given wireless mobile station and setup time information. To illustrate, when it is known that a particular mobile station cannot operate in the second mode of operation, the inactivity timer for the use during the first mode of operation can be dynamically extended in recognition of this inability. As another illustration, when setup time delay increases (or decreases) by, for example, more than a predetermined amount, the indicated temporal windows can be adjusted in a corresponding manner.

As noted, more than one such criterion can be monitored and/or evaluated when determining whether and how to adjust one or more inactivity temporal windows for one or more modes of operation for a mobile station. When using multiple criteria, the criteria themselves can be used in a manner where each is essentially equal in importance to the others. If desired, however, weighting factors or other techniques can be employed to emphasize or de-emphasize the relative importance of a given criterion as compared to other of the criteria. For example, a rapid increase in a rate of radio frequency measurement report message transmissions might be treated with considerable importance and urgency whereas overall setup time metrics for a given system might be weighted to de-emphasize somewhat the importance of this criteria with respect to the former.

The various embodiments of such a process can be realized in various ways as appropriate to the needs and capabilities of a given communication system and/or the wireless mobile stations. Some illustrative supporting platforms are illustrated in FIG. 5.

Such a platform 50 will typically comprise a processing platform 51. In a preferred approach this processing platform 51 will comprise a programmable entity (such as a microprocessor or microcontroller or the like) but a fixed-purpose entity could of course be employed when desired. It will also be understood that this processing platform 51 can comprise an integral entity as depicted or can comprise a virtual entity that is distributed (either locally or remotely) over a plurality of enabling platforms. Such architectural alternatives are well understood in the art and require no further elaboration here. Consistent with teachings set forth above, this processing platform 51 can be comprised as a part of a wireless mobile station, an infrastructure element such as a radio access network (RAN), or as part of both such elements in combination. Pursuant to a preferred approach, this processing platform 51 is programmed or otherwise adapted and configured, at least in part, to have instructions stored therein to automatically effect modification of one or more inactivity timers as described above (for example, as a function, at least in part, of mobility indicia information).

Such a platform 50 will typically comprise a first memory 52 that has inactivity timer information stored therein. Such information can comprise the executable timer code itself and/or one or more parameters as are used to establish the overall duration of the timer during use during a given mode of operation for the mobile station. In a preferred embodiment the platform 50 will also include another memory 53 that contains mobility indicia information as described above stored therein. By operably coupling these memories 52 and 53 to the processing platform 51, the latter can use both to establish the actual duration of an inactivity timer to be used under specific circumstances for a given wireless mobile station. Optionally, additional memory 54 can be used to store, for example, information regarding communication resources setup delay information and/or operating capabilities information as discussed above. By operably coupling such additional memory 54 to the processing platform 51, such information is available for use by the processing platform 51 when adjusting the inactivity timer (or timers) for a given mobile station for one or more modes of operation.

Figure 5:
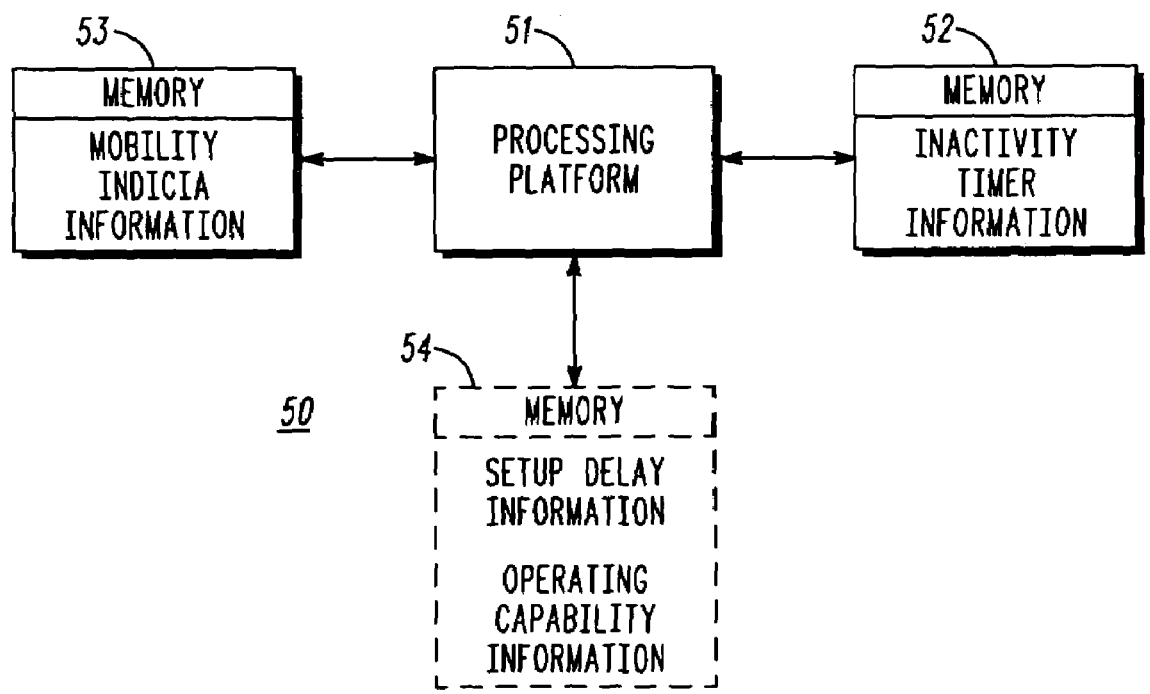
FIG. 5 comprises a block diagram as configured in accordance with various embodiments of the invention.

Those skilled in the art will recognize that such memories 52, 53, and 54 can be configured in a given embodiment as separate physical entities as suggested by the illustration in FIG. 5, or can share a common supporting platform. It will also be recognized that such memories can be separate physical entities from the processing platform 51 itself or can be integral thereto. All such embodiments are encompassed by these teachings.

Such a platform 50 will readily facilitate the various operational behaviors described above, but it will be clearly understood that other platforms could suffice as well.

Pursuant to these various embodiments, various operational capabilities or present conditions can be taken into account to permit dynamic adjustment of one or more inactivity timers as are used to determine when to cause a wireless mobile station to cease using a particular mode of operation and to begin using a different mode of operation. This in turn permits the specific needs and/or present experiences of a given mobile station to be taken into account to permit acceptable servicing of that mobile station while also facilitating a reasonable and balanced allocation of the resources of a given communication system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method for use with a wireless mobile station that is adapted and configured to interact with a wireless communication system using at least a first, second, and third mode of operation, wherein the first mode of operation comprises an active mode of operation where the mobile station actively uses an allocated communications channel, the third mode of operation comprises a dormant mode of operation where the mobile station is without an allocated communications channel, and the second mode of operation comprises a semi-dormant mode of operation where the mobile station maintains at least a portion of the allocated channel, comprising:
    monitoring at least one indicator of relative mobility regarding the rate of movement of the wireless mobile station within the wireless communication system to provide a mobility indicia;
    using the mobility indicia to adjust a first inactivity temporal window during at least one of the modes of operation wherein the first inactivity temporal window determines a duration the wireless mobile station remains in the at least one of the modes of operation, and
    using the mobility indicia to adjust a second inactivity temporal window during at least another of the one of the modes of operation wherein the second inactivity temporal window determines a duration the wireless mobile station remains in the at least another of the one of the modes of operation and wherein a duration of the first inactivity temporal window is extended and a duration of the second inactivity temporal window is decreased depending on the mobility indicia.

2. The method of claim 1 wherein monitoring at least one indicator of relative mobility regarding the wireless mobile station further comprises monitoring a hand-off rate as corresponds to the wireless mobile station.

3. The method of claim 1 wherein monitoring at least one indicator of relative mobility regarding the wireless mobile station further comprises accessing at least one metric that corresponds to radio frequency measurement report messages.

4. The method of claim 3 wherein accessing at least one metric that corresponds to radio frequency measurement report messages further comprises accessing a metric that corresponds to a rate at which the wireless mobile station transmits radio frequency measurement report messages.

5. The method of claim 1 and further comprising:
    determining an operating capability of the wireless mobile station;
    modifying at least one of the first and second inactivity temporal window as a function, at least in part, of the operating capability of the wireless mobile station.

6. The method of claim 2 wherein monitoring a hand-off rate as corresponds to the wireless mobile station further comprises monitoring a hand-off rate for at least a predetermined amount of time as corresponds to the wireless mobile station.

7. The method of claim 1 wherein monitoring at least one indicator of relative mobility regarding the wireless mobile station to provide a mobility indicia further comprises monitoring at an infrastructure element of the wireless communication system at least one indicator of relative mobility regarding the wireless mobile station to provide a mobility indicia.

8. The method of claim 1 wherein monitoring at an infrastructure element of the wireless communication system at least one indicator of relative mobility regarding the wireless mobile station to provide a mobility indicia further comprises monitoring at a radio access network (RAN) at least one indicator of relative mobility regarding the wireless mobile station to provide a mobility indicia.

9. The method of claim 1 wherein monitoring at least one indicator of relative mobility regarding the wireless mobile station to provide a mobility indicia further comprises monitoring at the wireless mobile station at least one indicator of relative mobility regarding the wireless mobile station to provide a mobility indicia.

10. The method of claim 1 wherein using the mobility indicia to adjust at least one of the first and second inactivity temporal window during a mode of operation further comprises using the mobility indicia to adjust a first inactivity temporal window during the first mode of operation to thereby dynamically control a duration of inactivity prior to automatically causing the wireless mobile station to cease using the first mode of operation and to begin using the second mode of operation.

11. The method of claim 1 wherein using the mobility indicia to adjust one of at least a first and a second inactivity temporal window during a mode of operation further comprises, when the mobility indicia corresponds to at least some predetermined amount of increased mobility, using the mobility indicia to increase an inactivity temporal window for use during the first mode of operation.

12. The method of claim 1 wherein using the mobility indicia to adjust one of at least a first and a second inactivity temporal window during a mode of operation further comprises using the mobility indicia to adjust an inactivity temporal window during the second mode of operation to thereby dynamically control a duration of inactivity prior to automatically causing the wireless mobile station to cease using the second mode of operation and to begin using a different mode of operation.

13. The method of claim 1 and further comprising:
  monitoring wireless communication system setup times to provide a setup time indicia;
  using the setup time indicia to further adjust at least one of the first and second inactivity temporal window during the mode of operation.

14. The method of claim 13 wherein monitoring wireless communication system setup times to provide a setup time indicia further comprises monitoring wireless communication system setup times for a plurality of wireless communication units to provide a setup time indicia.

15. The method of claim 13 wherein using the setup time indicia to further adjust at least one of the first and second inactivity temporal window during the mode of operation further comprises increasing the first inactivity temporal window in response to a setup time indicia that reflects a setup time delay that has increased by at least more than a predetermined amount.

16. The method of claim 13 wherein using the setup time indicia to further adjust at least one of the first and second inactivity temporal window during the mode of operation further comprises decreasing the second inactivity temporal window in response to a setup time indicia that reflects a setup time delay that has decreased by at least more than a predetermined amount.

17. The method of claim 1 wherein using the mobility indicia to adjust at least one of a first and a second inactivity temporal window during a mode of operation further comprises using the mobility indicia to adjust an inactivity temporal window for use during at least two different modes of operation.

18. A method for use with a wireless mobile station that is adapted and configured to interact with a wireless communication system using at least a first, second, and third mode of operation, wherein the first mode of operation comprises an active mode of operation where the mobile station actively uses an allocated communications channel, the third mode of operation comprises a dormant mode of operation where the mobile station is without allocated communications channel, and the second mode of operation comprises a semi-dormant mode of operation where the mobile station maintains at least a portion of the allocated channel, comprising:
  monitoring at least one indicator of communication resources setup delay information as corresponds to the wireless communication system to provide a setup delay indicia;
  using the setup delay indicia to adjust a first inactivity temporal window as corresponds to the wireless mobile station during a mode of operation wherein the inactivity temporal window determines a duration the wireless mobile station remains in one of the first, second and third mode of operation, and
  using the setup delay indicia to adjust second inactivity temporal window as corresponds to the wireless mobile station during another mode of operation wherein the second inactivity temporal window determines a duration the wireless mobile station remains in another of the first, second and third mode of operation and wherein a duration first inactivity temporal window is extended and a duration of the second inactivity temporal window is decreased depending on the setup delay indicia.

19. The method of claim 18 wherein monitoring at least one indicator of communication resources setup delay information as corresponds to the wireless communication system further comprises monitoring at least one indicator of communication resources setup delay information as corresponds to the wireless communication system for a plurality of wireless mobile stations.

20. The method of claim 18 and further comprising:
  monitoring at least one indicator of relative mobility regarding the wireless mobile station to provide a mobility indicia;
  using the mobility indicia to further adjust the first and the second inactivity temporal window during the mode of operation.

* * * * *